(12) United States Patent
Dunkle

(10) Patent No.: US 6,662,820 B2
(45) Date of Patent: Dec. 16, 2003

(54) WELDABLE MOUNT FOR FUEL SYSTEM COMPONENT

(75) Inventor: Gary Dunkle, Connersville, IN (US)

(73) Assignee: Stant Manufacturing Inc., Connersville, IN (US)

( * ) Notice: Subject to any disclaimer, the term of this patent is extended or adjusted under 35 U.S.C. 154(b) by 79 days.

(21) Appl. No.: 10/010,407

(22) Filed: Dec. 6, 2001

(65) Prior Publication Data

US 2003/0106586 A1 Jun. 12, 2003

(51) Int. Cl.⁷ .............................................. F16K 24/04
(52) U.S. Cl. ...................................... 137/202; 137/587
(58) Field of Search ................................. 137/202, 587

(56) References Cited

U.S. PATENT DOCUMENTS

| | | |
|---|---|---|
| 3,385,468 A | 5/1968 | Fleming et al. |
| 4,351,350 A | 9/1982 | Crute |
| 4,646,772 A | 3/1987 | Bergsma |
| 4,694,870 A | 9/1987 | Vize |
| 4,702,268 A | 10/1987 | Ambruster et al. |
| 4,730,652 A | 3/1988 | Bartholomew |
| 4,753,262 A | 6/1988 | Bergsma |
| 5,028,244 A | 7/1991 | Szlaga |
| 5,139,043 A | 8/1992 | Hyde et al. |
| 5,404,907 A | 4/1995 | Benjey et al. |
| 5,443,098 A | 8/1995 | Kertesz |
| 5,954,091 A | 9/1999 | Leadford |
| 6,035,883 A | 3/2000 | Benjey |
| 6,085,771 A | 7/2000 | Benjey et al. |
| 6,189,567 B1 | 2/2001 | Foltz |
| 6,308,735 B1 | 10/2001 | Foltz |
| 6,382,231 B2 * | 5/2002 | Sugizaki et al. ............. 137/202 |
| 6,408,867 B2 * | 6/2002 | Aoki et al. .................. 137/202 |
| 6,422,261 B1 * | 7/2002 | DeCapua et al. ............ 137/202 |
| 6,431,200 B2 * | 8/2002 | Brock et al. ................ 137/202 |
| 6,484,741 B2 * | 11/2002 | Benjey et al. .............. 137/202 |

FOREIGN PATENT DOCUMENTS

| | | | |
|---|---|---|---|
| EP | 0597314 A1 | 10/1993 | |
| JP | 2000-008981 | * 1/2000 | ................. 137/202 |

* cited by examiner

Primary Examiner—Gerald A. Michalsky
(74) Attorney, Agent, or Firm—Barnes & Thornburg

(57) ABSTRACT

A vent apparatus includes a valve assembly and a tank mount adapted to support the valve assembly in a mounting aperture formed in a fuel tank. The valve assembly includes a movable vent valve and a valve housing containing the movable vent valve. A labyrinthine boundary is established between the valve housing and the tank mount to provide a low-permeation joint therebetween. The valve housing is made of a non-weldable plastics material and the tank mount is made of a weldable plastics material.

27 Claims, 4 Drawing Sheets

WELDABLE MOUNT FOR FUEL SYSTEM COMPONENT

BACKGROUND AND SUMMARY

The present disclosure relates to a fuel system component, and particularly to a fuel tank valve assembly for venting a fuel tank made of a polymeric material. More particularly, the present disclosure relates to a weldable mount that is adapted to be welded to a fuel tank to mount a fuel tank valve assembly in a fixed position in an aperture formed in a top wall of the fuel tank.

According to the present disclosure, a vent apparatus includes a valve assembly and a tank mount. The valve assembly includes a valve housing made of a non-weldable plastics material and a valve arranged to move within an interior region formed in the valve housing to open and close a vent aperture formed in the valve housing. The tank mount is made of a weldable plastics material and adapted to support the valve housing within a mounting aperture formed in a fuel tank so as to vent the fuel tank via the valve assembly.

The tank mount includes an annular base adapted to be coupled to a fuel tank and a housing mount appended to the annular base. The tank mount further includes a plurality of annular flanges appended to an exterior surface of the housing mount. The annular flanges are arranged to lie in series in spaced-apart relation to one another and in mating relation to an outer portion of the valve housing to define a labyrinthine boundary between the tank mount and the outer portion of the valve housing.

In one embodiment, the valve housing includes a cylindrical chamber portion defining the interior region containing the movable valve. The outer portion of the valve housing is coupled to the top end of the cylindrical chamber portion and is formed to include the vent aperture. The outer portion includes a top wall overlying the housing mount and mating with some of the annular flanges and a side wall surrounding the housing mount and mating with others of the annular flanges. The valve housing further includes a venting outlet coupled to the top wall of the outer portion and provided to conduct fuel vapor from the interior region of the chamber portion through the vent aperture to a destination outside the valve housing.

Additional features of the present disclosure will become apparent to those skilled in the art upon consideration of the following detailed description of illustrative embodiments of the disclosure exemplifying the best mode of carrying out the disclosure as presently perceived.

BRIEF DESCRIPTION OF THE DRAWINGS

The detailed description particularly refers to the accompanying figures in which.

DETAILED DESCRIPTION OF THE DRAWINGS

Figure 1:
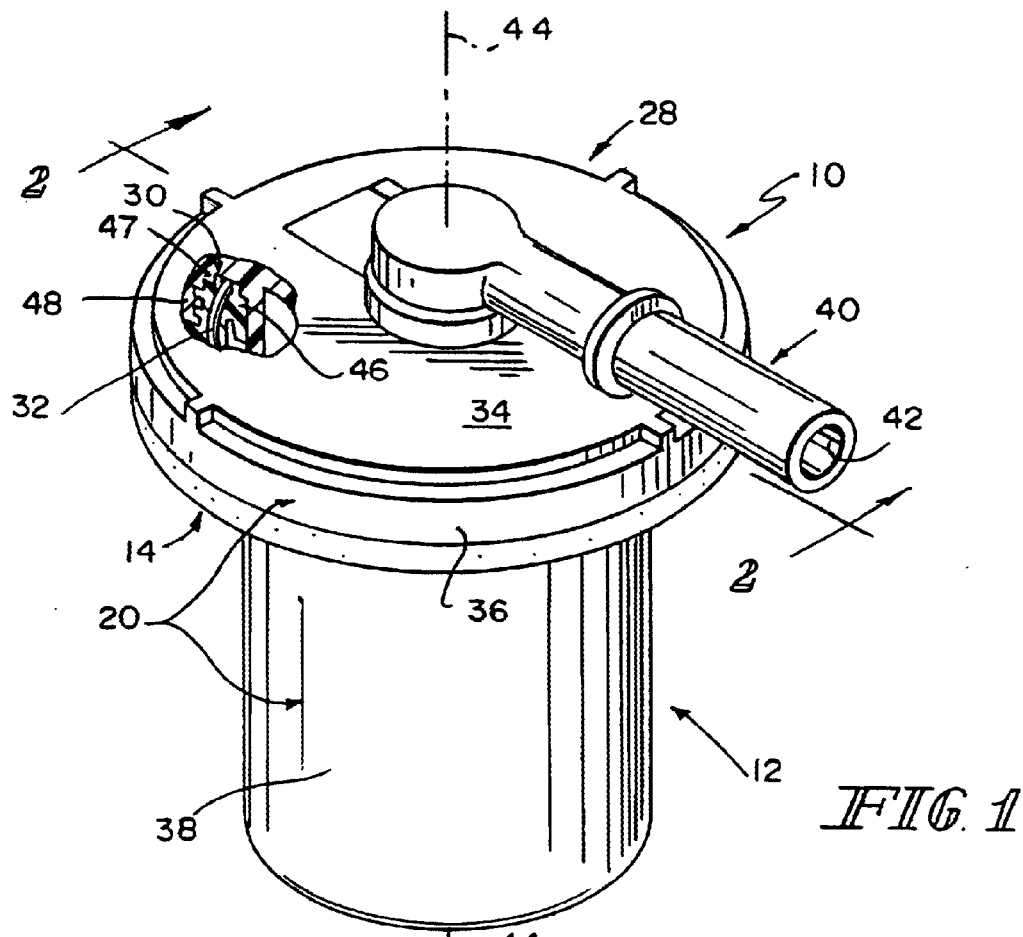
FIG. 1 is a perspective view of a vent apparatus in accordance with a first embodiment of the disclosure.
Figure 2:
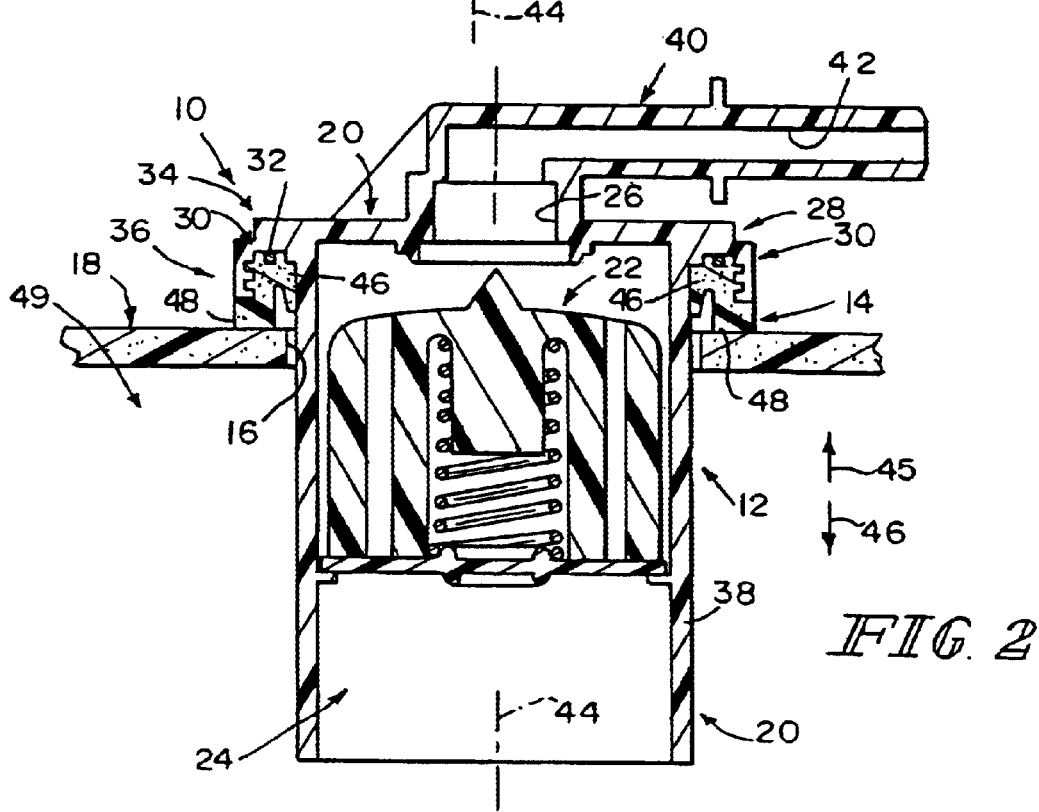
FIG. 2 is a sectional view taken along line 2—2 of FIG. 1 showing the vent apparatus mounted in an aperture formed in a top wall of a fuel tank made of a weldable plastics material and showing a ring-shaped tank mount welded to the top wall of the fuel tank and coupled to a valve housing made of a non-weldable plastics material along a "labyrinthine" boundary between the tank mount and the valve housing to support a valve chamber portion of the valve housing in the fuel tank and a venting outlet of the valve housing outside of the fuel tank.

A vent apparatus 10 includes a valve assembly 12 and a tank mount 14 for supporting valve assembly 12 in a mounting aperture 16 formed in a fuel tank 18 as shown, for example, in FIGS. 1 and 2. Tank mount 14 is made of a weldable plastics material so that it can be welded to fuel tank 18, which is also made of a weldable plastics material, as shown in FIG. 2.

Valve assembly 12 includes a valve housing 20 made of a non-weldable plastics material and a valve 22 mounted for movement in an interior region 24 to control discharge of fuel vapor from fuel tank 18 through a vent aperture 26 formed in valve housing 20. An outer portion 28 of valve housing 20 surrounds a portion of tank mount 14 to establish a labyrinthine boundary 30 between tank mount 14 and outer portion 28 of valve housing 20 as shown, for example, in FIGS. 1, 2, and 7. In the embodiment illustrated in FIGS. 1–6, an O-ring seal 32 is provided along labyrinthine boundary 30, whereas in the embodiment illustrated in FIG. 6, O-ring seal 32 is omitted.

Outer portion 28 of valve housing 20 includes a top wall 34 that is formed to include vent aperture 26 and a side wall 36 that is arranged to depend from top wall 34. Valve housing 20 further includes a chamber portion 38 coupled to the underside of top wall 34 and a venting outlet 40 coupled to the top side of top wall 34 as shown, for example, in FIG. 2. Chamber portion 38 provides the interior region 24 containing movable valve 22 and venting outlet 40 provides a fuel discharge passageway 42 for conducting fuel vapor that has been discharged from interior region 24 of chamber portion 38 past the "opened" valve 22 via vent aperture 26 to a destination outside valve housing 20 as suggested in FIG. 2. In one embodiment, top wall 34 of outer portion 28 is annular and side wall 36 is also annular and extends in an axially downward direction from a circular perimeter edge of annular top wall 34. In an illustrative embodiment, chamber portion 38 is defined by a cylindrical sleeve having an axially upper end appended to the underside of top wall 34.

A vertical axis 44 extends through valve housing 20 as suggested in FIGS. 1 and 2. Valve 22 is arranged in interior region 24 of chamber portion 38 to move in an axially upward direction 45 to close vent aperture 26 and in an axially downward direction 46 to open vent aperture 26 as suggested in FIG. 2. It is within the scope of this disclosure to configure chamber portion 38, valve 22, and venting outlet 40 in any suitable manner to achieve a desired fuel tank venting objective.

Tank mount 14 includes a housing mount 46 coupled to valve housing 20, one or more external flanges 47 appended to an exterior surface of housing mount 46, and an annular base 48 adapted to be welded to fuel tank 18 to support valve housing 20 in a mounting aperture 16 formed in fuel tank 18 as shown, for example, in FIG. 2. Tank mount 14 is a monolithic element made of a weldable plastics material such as high density polyethylene (HDPE), nylon, or any other suitable polymeric plastic or other material. Valve housing 20 is made of a non-weldable plastics material such as Acetal.

An "undulating" exterior surface defined by housing mount 46 and various external flanges 47 coupled to housing mount 46 mates with the surrounding side wall 36, overlying top wall 34, and an axially upper portion of chamber portion 38 to define a labyrinthine boundary 30 therebetween. The labyrinthine boundary 30 established between an exterior portion of tank mount 14 and an interior portion of outer portion 20 of valve housing 20 as suggested, for example, in FIG. 2, serves as a tortuous or serpentine "barrier" to flow of fuel vapor from an interior region 49 in fuel tank 18 via mounting aperture 16 and around chamber portion 38 of valve housing 20 through any unwanted "fuel vapor leakage passageway" that might develop along the labyrinthine boundary 30 between valve housing 20 and tank mount 14. By welding annular base 48 of tank mount 14 to fuel tank 18, a fuel vapor leakage barrier therebetween is established. In one embodiment, the valve housing 20 made of a non-weldable plastics material is "overmolded" onto the tank mount 14 made of a weldable plastics material as shown, for example, in FIGS. 5 and 6, to establish the labyrinthine boundary 30 between valve housing 20 and tank mount 14.

Figure 3:
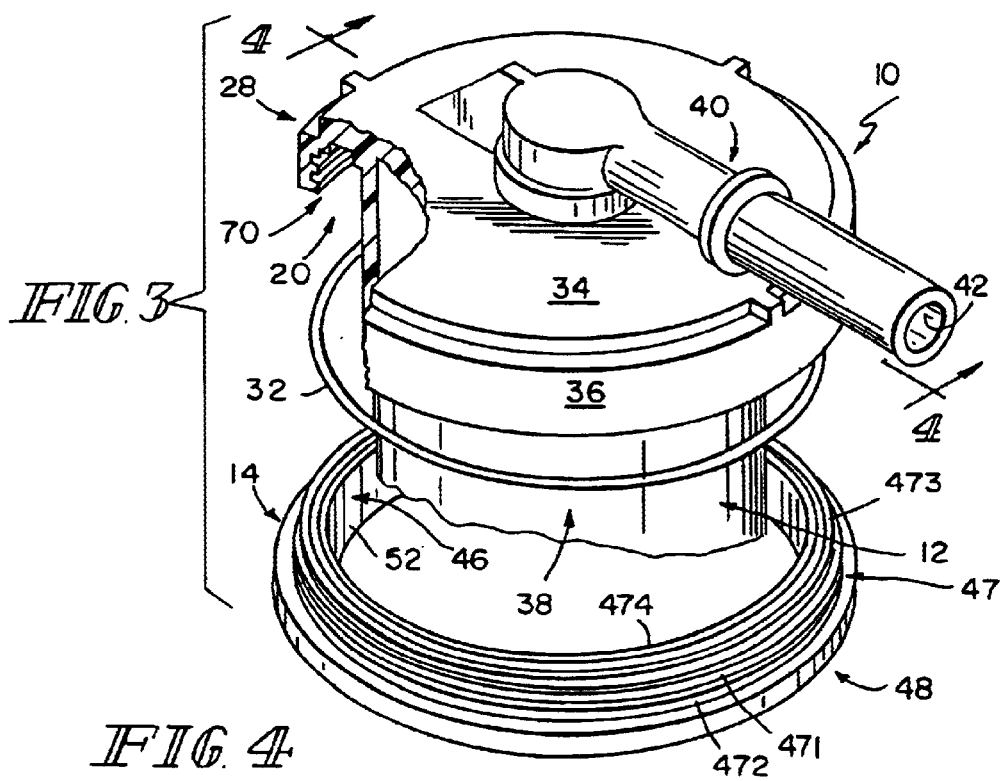
FIG. 3 is a perspective view of the vent apparatus components of FIGS. 1 and 2 prior to assembly showing an O-ring sized to fit in an annular groove formed in the tank mount to establish an annular seal located between the tank mount and the valve housing.
Figure 4:
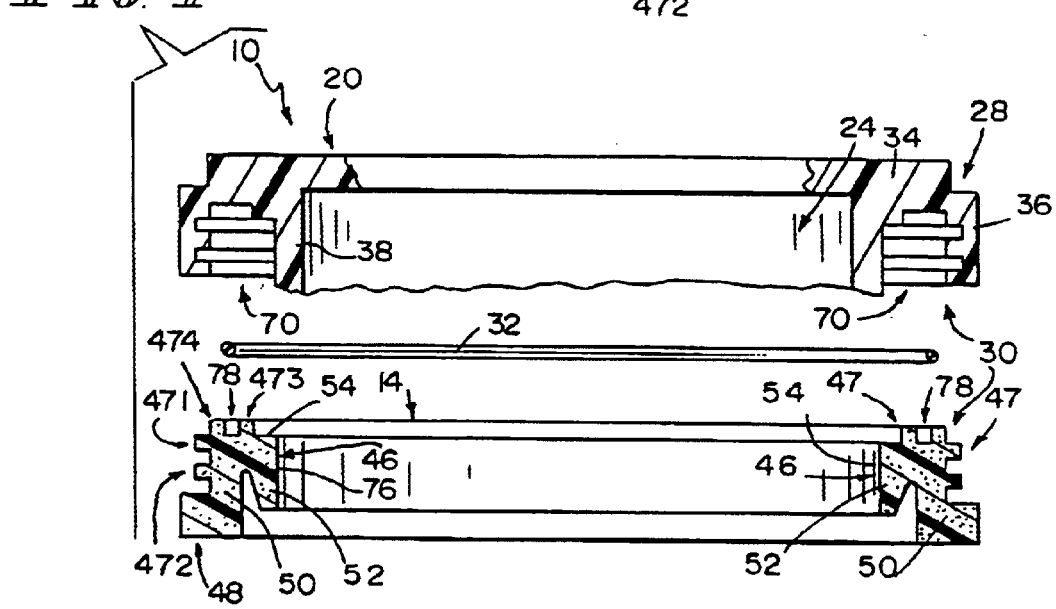
FIG. 4 is a sectional view taken along line 4—4 of FIG. 3 showing a portion of the valve housing, the O-ring, and the tank mount wherein the tank mount includes an annular base, a housing mount coupled to the top of the annular base, two axially spaced-apart and radially outwardly extending annular flanges coupled to the housing mount, and two radially spaced-apart and axially upwardly extending annular flanges coupled to the housing mount.

The exterior shape of one embodiment of tank mount 14 is shown best in FIGS. 3 and 4. Housing mount 46, annular flanges 47, and annular base 48 cooperate to define the exterior shape of tank mount 14. Housing mount 46 includes an axially extending outer sleeve 50 arranged to mate with annular side wall 36 of outer portion 28 of valve housing 20, an axially extending inner sleeve 52 arranged to mate with an axially upper portion of chamber portion 38, and a radially extending annular bridge 54 coupled to axially upper ends of the outer and inner sleeves 50, 52. Annular flanges 47 include a pair of annular flanges 471, 472 coupled to outer sleeve 50 of housing mount 46 and another pair of annular flanges 473, 474 coupled to annular bridge 54 of housing mount 46. Annular base 48 is coupled to an axially lower end of outer sleeve 50 and is adapted to be welded to a portion of fuel tank 18 that lies around mounting aperture 16.

Figure 4A:
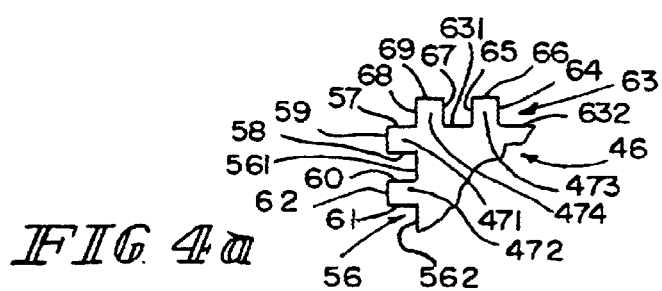
FIG. 4a is an enlarged diagrammatic view of the tank mount shown in FIG. 4 showing four annular flanges carried on exterior surfaces of the housing mount.

A first annular flange 471 is appended to a radially outwardly facing exterior wall 56 of housing mount 46 as suggested in FIGS. 4 and 4a. First annular flange 471 includes an axially upwardly facing annular surface 57, an axially downwardly facing annular surface 58, and a radially outwardly facing annular surface 59 lying therebetween.

A second annular flange 472 is appended to radially outwardly facing exterior wall 56 as suggested in FIGS. 4 and 4a. Second annular flange 472 is also arranged to lie between and in axially spaced-apart relation to each of first annular flange 471 and annular base 48. Second annular flange 472 includes an axially upwardly facing surface 60, an axially downwardly facing surface 61, and a radially outwardly facing annular surface 62 lying therebetween.

A third annular flange 473 is appended to an axially upwardly facing exterior wall 63 of housing mount 46 as suggested in FIGS. 4 and 4a. Third annular flange 473 includes a radially inwardly facing, axially upwardly extending annular surface 64, a radially outwardly facing, axially upwardly extending annular surface 65, and an axially upwardly facing annular surface 66 lying therebetween.

A fourth annular flange 474 is appended to axially upwardly facing exterior wall 63 as suggested in FIGS. 4 and 4a. Fourth annular flange 474 is also arranged to lie in a position surrounding third annular flange 473. Fourth annular flange 474 includes a radially inwardly facing, axially upwardly extending annular surface 67, a radially outwardly facing, axially upwardly extending annular surface 68, and an axially upwardly facing annular surface 69 lying therebetween.

As suggested in FIG. 4, valve housing 20 is formed to include an axially downwardly opening annular channel 70. Once valve housing 20 is over-molded onto tank mount 14 as shown, for example, in FIGS. 5 and 6, housing mount 46 and annular flanges 47 (e.g., flanges 471, 472, 473, and 474) cooperate to mate with annular side wall 36 and annular top wall 38 of outer portion 28 and with (in the illustrated embodiment) an axially upper portion of chamber portion 38 to define labyrinthine boundary 30 therebetween to minimize any opportunity for fuel vapor extant in fuel tank 18 to "leak" to the atmosphere through any leakage passageway that might develop along boundary 30. The "labyrinthine" character of boundary 30 provides various "turns" which would function to inhibit any significant flow of fuel vapor therealong.

Labyrinthine boundary 30 can be "divided" into various "portions" along its length for purposes of describing one embodiment of such a boundary 30. Radially outwardly facing exterior wall 56 of housing mount 46 provides first and second portions of labyrinthine boundary 30 while first and second annular flanges 471, 472 provide third and fourth portions of boundary 30. Axially upwardly facing exterior wall 63 of housing mount 46 provides a fifth portion of labyrinthine boundary 30 while third and fourth annular flanges 473, 474 provide sixth and seventh portions of boundary 30.

An upper annular surface 561 of radially outwardly facing surface 56 lies between first and second annular flanges 471, 472 as shown in FIGS. 4 and 4a. Upper annular surface 561 mates with annular side wall 36 of outer portion 28 to define a first portion of labyrinthine boundary 30 as shown in FIG. 2.

A lower annular surface 562 of radially outwardly facing surface 56 lies between second annular flange 472 and annular base 48 as suggested in FIGS. 4 and 4a. Lower annular surface 562 mates with annular side wall 36 of outer portion 28 to define a second portion of labyrinthine boundary 30 as shown in FIG. 2.

Annular surfaces 57, 58, and 59 of first annular flange 471 cooperate to mate with annular side wall 36 of outer portion 28 to define a third portion of labyrinthine boundary 30 as shown in FIG. 2. Likewise, annular surfaces 60, 61, and 62 of second annular flange 472 cooperate to mate with annular side wall 36 of outer portion 28 to define a fourth portion of labyrinthine boundary 30 as shown in FIG. 2.

An upwardly facing annular surface 631 of axially upwardly facing exterior wall 63 lies between third and fourth annular flanges 473, 474 as suggested in FIGS. 4 and 4a. Upwardly facing annular surface 631 mates with top wall 34 of outer portion 28 to define a fifth portion of labyrinthine boundary 30 as shown in FIG. 2.

Annular surfaces 64, 65, and 66 of third annular flange 473 cooperate to mate with top wall 34 of outer portion 28 to define a sixth portion of labyrinthine boundary 30. Likewise, annular surfaces 67, 68, and 69 of fourth annular flange 474 cooperate to mate with top wall 34 of outer portion 28 to define a seventh portion of labyrinthine boundary 38 as shown in FIG. 2.

An upwardly facing annular surface 632 of axially upwardly facing exterior wall 63 lies radially "inside" fourth annular flange 474 as suggested in FIGS. 4 and 4a. Upwardly facing exterior wall 632 mates with top wall 34 of outer portion 28 to define an eighth portion of labyrinthine boundary 30 as shown in FIG. 2. A radially inwardly facing, axially downwardly extending annular surface 76 of inner sleeve 52 mates with an axially upper portion of chamber portion 38 to define a ninth portion of labyrinthine boundary 30 as shown in FIG. 2.

In the embodiment illustrated in FIGS. 1–5, O-ring seal 32 is made of a low-permeation elastomer material and is positioned to lie in an axially upwardly opening annular channel 78 defined by annular surfaces 65, 67, and 631. O-ring seal 32 is omitted in the embodiment illustrated in FIG. 7.

Figure 5:
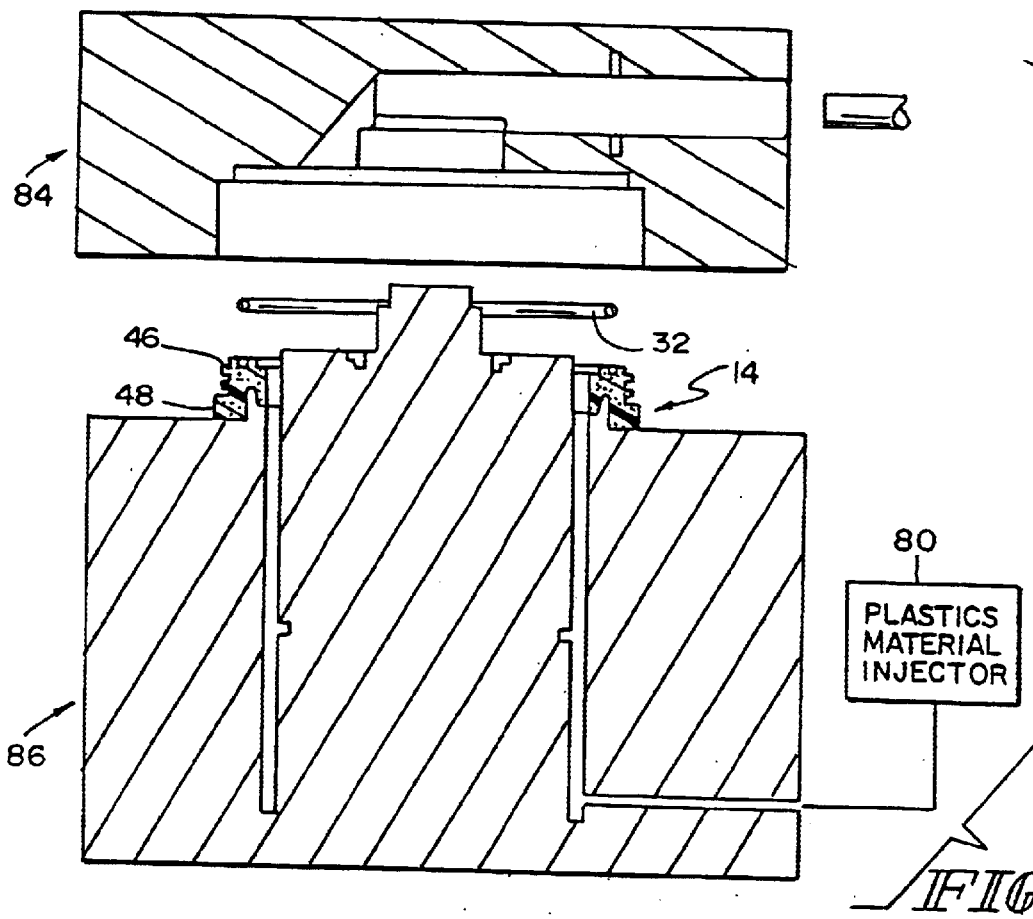
FIG. 5 is a sectional view of a plastic injection mold having an upper mold portion and a lower mold portion, here shown spaced apart in an "opened" position, and showing the ring-shaped tank mount pre-positioned within the lower mold portion and the O-ring above an annular groove formed in the tank mount prior to closing the mold and injecting a non-weldable plastics material into a mold cavity formed in the upper and lower mold portions (in the manner shown in FIG. 6)
Figure 6:
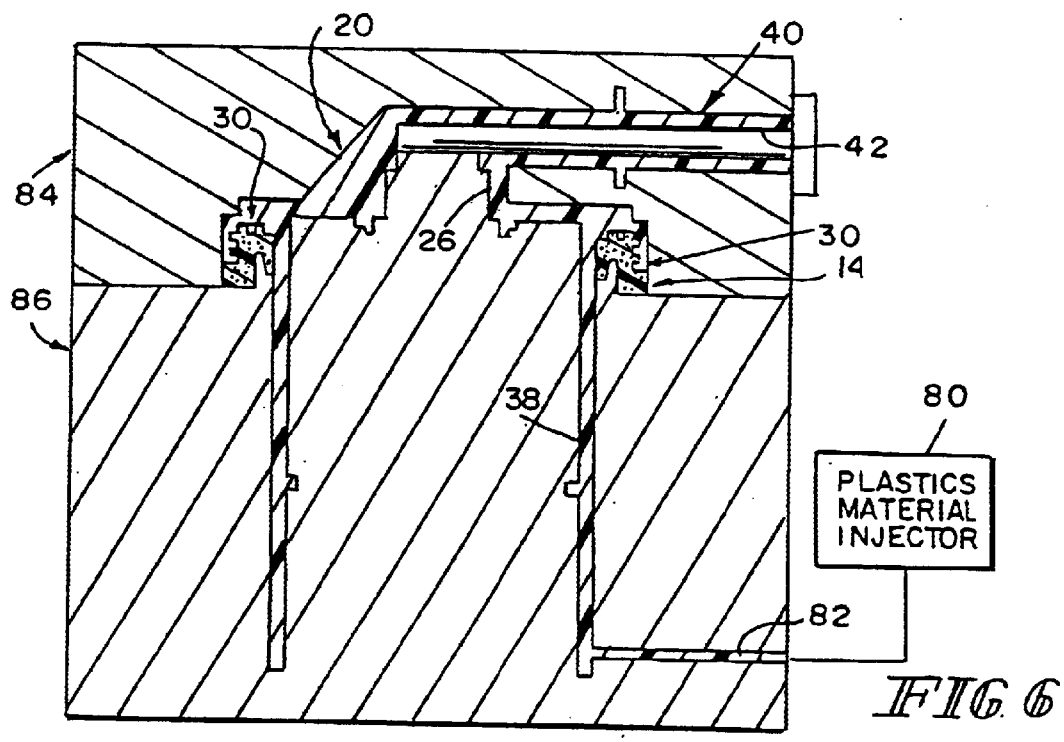
FIG. 6 is a sectional view similar to FIG. 5 showing the upper and lower mold portions in a "closed" position and a non-weldable plastics material injected into the mold cavity through a channel formed in the lower mold portion so as to "over-mold" non-weldable plastics material onto the ring-shaped tank mount to form a valve housing coupled to the tank mount.
Figure 7:
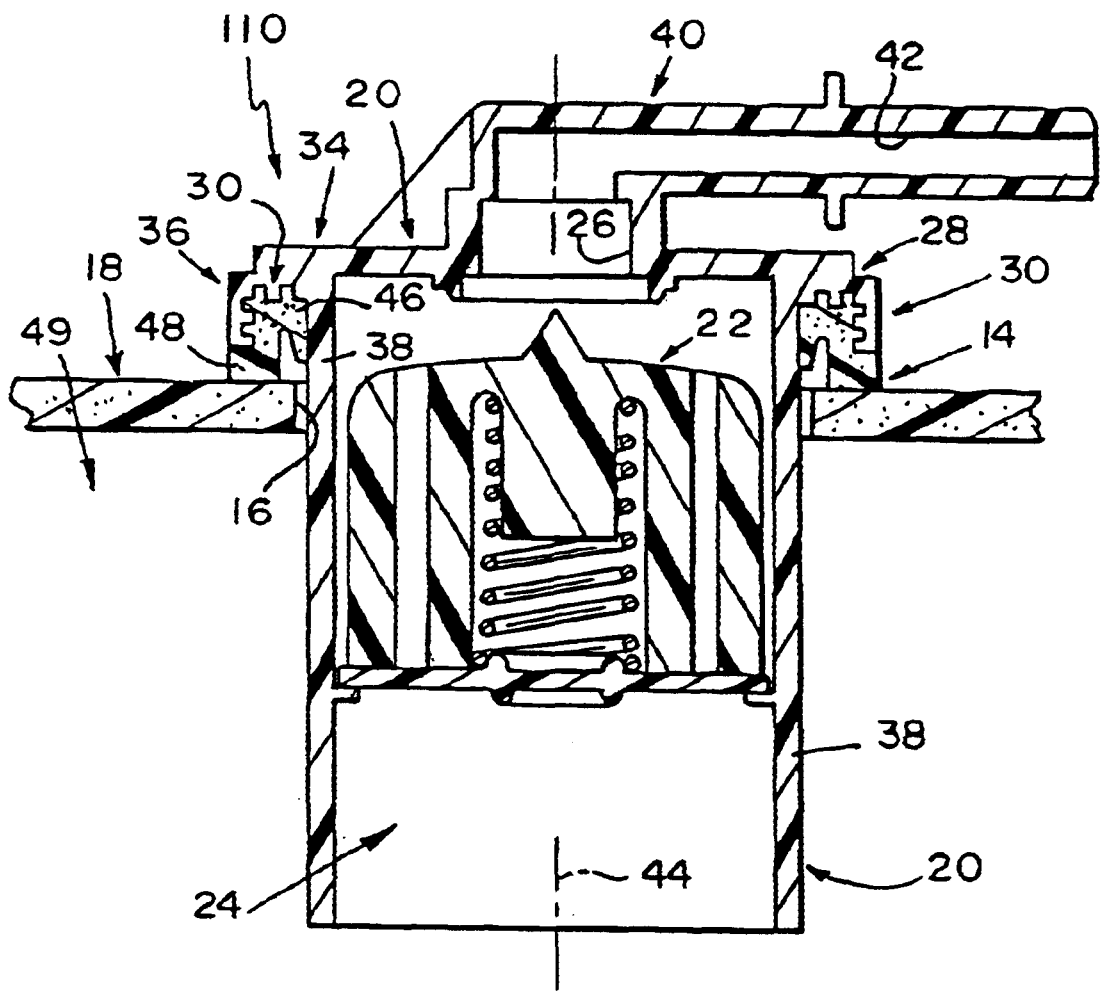
FIG. 7 is a perspective view of a vent apparatus in accordance with a second embodiment of the disclosure wherein the O-ring is omitted.

One method of mating valve housing 20 to tank mount 14 is illustrated in FIGS. 5 and 6. A plastics material injector 80 is used to introduce a non-weldable plastics material 82 into a mold cavity containing tank mount 14 and defined in upper and lower mold portions 84, 86. Reference is hereby made to U.S. Pat. No. 6,308,735, the disclosure of which is incorporated in its entirety herein, for descriptions of a process for overmolding a valve housing made of a non-weldable plastics material onto a tank mount made of a weldable plastics material. Injection pressure can act to compress O-ring seal 32 as required in annular channel 70.

Labyrinthine boundary 30 establishes a low-permeation joint between tank mount 14 and valve housing 20. A hot plate welding process can be used to couple tank mount 14 to fuel tank 18 and valve housing 20 is coupled to tank mount 14 to provide a low-permeation joint therebetween to minimize unwanted fuel vapor leakage therebetween.

What is claimed is:

1. A vent apparatus adapted to be coupled to a fuel tank, the apparatus comprising
    a valve housing made of a non-weldable plastics material, the valve housing being formed to include a chamber portion defining an interior region, an outer portion coupled to the chamber portion and formed to include an aperture, and a venting outlet coupled to the outer portion at the aperture and provided to conduct fuel vapor from the interior region of the chamber portion to a destination outside the valve housing,
    a valve positioned to lie within the interior region of the chamber portion and arranged to move within the interior region to open and close the aperture defined by the outer portion, and
    a tank mount made of a weldable plastics material, the tank mount including a housing mount coupled to the valve housing, an annular base coupled to the housing mount and adapted to be coupled to a fuel tank to support the chamber portion within a mounting aperture formed in the fuel tank, and a plurality of annular flanges appended to an exterior surface of the housing mount and arranged to lie in series in spaced-apart relation to one another and in mating relation to the outer portion of the valve housing to define a labyrinthine boundary between the tank mount and the outer portion of the valve housing.

2. The apparatus of claim 1, wherein the exterior surface of the housing mount includes a radially outwardly facing exterior wall, a first of the annular flanges is appended to the radially outwardly facing exterior wall and arranged to lie in axially spaced-apart relation to the annular base, and a second of the annular flanges is appended to the radially outwardly facing exterior wall and arranged to lie between and in axially spaced-apart relation to each of the first of the annular flanges and to the annular base.

3. The apparatus of claim 2, wherein the annular base has an outer diameter and each of the first and second of the annular flanges has an outer diameter that is less than the outer diameter of the annular base.

4. The apparatus of claim 3, wherein the outer diameters of the first and second of the annular flanges are equivalent.

5. The apparatus of claim 2, wherein the radially outwardly facing exterior wall includes an upper annular surface lying between the first and second of the annular flanges and mating with the outer portion of the valve housing to define a first portion of the labyrinthine boundary between the outer portion of the valve housing and the tank mount and a lower annular surface lying between the second of the annular flanges and the annular base and mating with the outer portion of the housing to define a second portion of the labyrinthine boundary.

6. The apparatus of claim 5, wherein the first of the annular flanges includes an axially upwardly facing annular surface, an axially downwardly facing annular surface, and a radially outwardly facing annular surface lying therebetween, said annular surfaces of the first of the annular flanges cooperate to mate with the outer portion of the valve housing to define a third portion of the labyrinthine boundary, the second of the annular flanges includes an axially upwardly facing annular surface, an axially downwardly facing annular surface, and a radially outwardly facing annular surface lying therebetween, and said annular surfaces of the second of the annular flanges cooperate to mate with the outer portion of the valve housing to define a fourth portion of the labyrinthine boundary.

7. The apparatus of claim 2, wherein the exterior surface of the housing mount further includes an axially upwardly facing exterior wall, a third of the annular flanges is appended to the axially upwardly facing exterior wall, and a fourth of the annular flanges is appended to the axially upwardly facing exterior wall in a position surrounding the third of the annular flanges and lying between the first and third of the annular flanges.

8. The apparatus of claim 7, wherein the radially outwardly facing exterior wall includes an upper annular surface lying between the first and second of the annular flanges and mating with the outer portion of the valve housing to define a first portion of the labyrinthine boundary between the outer portion of the valve housing and the tank mount and a lower annular surface lying between the second of the annular flanges and the annular base and mating with the outer portion of the housing to define a second portion of the labyrinthine boundary, the first of the annular flanges includes an axially upwardly facing annular surface, an axially downwardly facing annular surface, and a radially outwardly facing annular surface lying therebetween, said annular surfaces of the first of the annular flanges cooperate to mate with the outer portion of the valve housing to define a third portion of the labyrinthine boundary, the second of the annular flanges includes an axially upwardly facing annular surface, an axially downwardly facing annular surface, and a radially outwardly facing annular surface lying therebetween, said annular surfaces of the second of the annular flanges cooperate to mate with the outer portion of the valve housing to define a fourth portion of the labyrinthine boundary, the axially upwardly facing exterior wall includes an upwardly facing annular surface lying between the third and fourth of the annular flanges and mating with the outer portion of the valve housing to define a fifth portion of the labyrinthine boundary, the third of the annular flanges includes a radially inwardly facing, axially upwardly extending annular surface, a radially outwardly facing, axially upwardly extending annular surface, and an axially upwardly facing annular surface lying therebetween, said annular surfaces of the third of the annular flanges cooperating to define a sixth portion of the labyrinthine boundary, the fourth of the annular flanges includes a radially inwardly facing, axially upwardly extending annular surface, a radially outwardly facing, axially upwardly extending annular surface, and an axially upwardly facing annular surface lying therebetween, and said annular surfaces of the fourth of the annular flanges cooperate to define a seventh portion of the labyrinthine boundary.

9. The apparatus of claim 1, wherein the housing mount includes an axially extending annular outer sleeve carrying a first and second of the annular flanges, an axially lower end of the axially extending annular outer sleeve is coupled to the annular base, and the housing mount further includes a radially extending annular bridge coupled to an axially upper end of the axially extending outer sleeve and located to carry a third and fourth of the annular flanges.

10. The apparatus of claim 9, wherein the fourth of the annular flanges is arranged to surround the third of the annular flanges and lie between the first and third of the annular flanges.

11. The apparatus of claim 9, further comprising an O-ring seal positioned to lie between the third and fourth of the annular flanges.

12. The apparatus of claim 9, wherein the housing mount further includes an axially extending inner sleeve, the axially extending outer sleeve is positioned to lie in spaced-apart relation to and around the axially extending inner sleeve, and the radially extending annular bridge is coupled to axially upper ends of each of the axially extending inner and outer sleeves.

13. The apparatus of claim 12, wherein the chamber portion of the valve housing includes a cylindrical exterior surface and the axially extending inner sleeve of the housing mount surrounds the cylindrical exterior sleeve.

14. The apparatus of claim 12, wherein the housing mount has an inverted U-shaped cross section.

15. The apparatus of claim 12, wherein the axially extending outer sleeve and the annular flanges carried thereon mate with a side wall of the outer portion to define a radially outer section of the labyrinthine boundary, the radially extending annular bridge and the annular flanges carried thereon mate with a top wall of the outer portion to define an axially upper section of the labyrinthine boundary, and the axially extending inner sleeve mates with an exterior surface of the chamber portion to define a radially inner section of the labyrinthine boundary.

16. The apparatus of claim 1, wherein the housing mount includes an axially upwardly facing exterior wall and a radially outwardly facing exterior wall and one of the annular flanges is appended to each of said exterior walls.

17. The apparatus of claim 16, wherein two of the annular flanges are appended to the axially upwardly facing exterior wall and positioned to lie in spaced-apart relation to one another.

18. The apparatus of claim 17, wherein an O-ring seal is positioned to lie in a space located between said two of the annular flanges.

19. The apparatus of claim 16, wherein two of the annular flanges are appended to the radially outwardly facing exterior wall.

20. A vent apparatus adapted to be coupled to a fuel tank, the apparatus comprising
   a valve housing made of a non-weldable plastics material, the valve housing including an outer portion having an annular top wall and an annular side wall depending from the top wall,
   a valve positioned to lie within an interior region formed in the valve housing and arranged to move within the interior region to open and close a vent aperture formed in the valve housing,
   a tank mount made of a weldable plastics material, the tank mount including a housing mount arranged to mate with the annular top and side walls and an annular base coupled to the housing mount and adapted to be coupled to a fuel tank to support at least a portion of the valve housing within an interior region formed in the fuel tank, and wherein the annular side wall of the valve housing is arranged to surround the housing mount,
   wherein the housing mount includes a radially outwardly facing exterior wall contacting the annular side wall of the valve housing and an axially upwardly facing exterior wall contacting the top wall of the valve housing, and
   wherein the tank mount further includes a spaced-apart pair of radially outwardly extending annular flanges appended to the radially outwardly facing exterior wall of the housing mount and arranged to mate with the side wall of the valve housing to define a radially outer section of a labyrinthine boundary between the tank mount and the valve housing.

21. The vent apparatus of claim 20, wherein the tank mount further includes a spaced-apart pair of axially outwardly extending annular flanges appended to the axially upwardly facing exterior wall of the housing mount and arranged to mate with the top wall of the valve housing to define an axially outer section of the labyrinthine boundary between the tank mount and the valve housing.

22. A vent apparatus adapted to be coupled to a fuel tank, the apparatus comprising
   a valve housing made of a non-weldable plastics material, the valve housing including an outer portion having an annular top wall and an annular side wall depending from the top wall,
   a valve positioned to lie within an interior region formed in the valve housing and arranged to move within the interior region to open and close a vent aperture formed in the valve housing, a tank mount made of a weldable plastics material, the tank mount including a housing mount arranged to mate with the annular top and side walls and an annular base coupled to the housing mount and adapted to be coupled to a fuel tank to support at least a portion of the valve housing within an interior region formed in the fuel tank, and wherein the annular side wall of the valve housing is arranged to surround the housing mount, wherein the housing mount includes a radially outwardly facing exterior wall contacting the annular side wall of the valve housing and an axially upwardly facing exterior wall contacting the top wall of the valve housing, and wherein the tank mount further includes a spaced-apart pair of axially outwardly extending annular flanges appended to the axially upwardly facing exterior wall of the housing mount and arranged to mate with the top wall of the valve housing to define an axially outer section of a labyrinthine boundary between the tank mount and the valve housing.

23. The vent apparatus of claim 22, further comprising an O-ring seal positioned to lie between the pair of axially outwardly extending annular flanges.

24. A vent apparatus adapted to be coupled to a fuel tank, the apparatus comprising a valve housing made of a non-weldable plastics material, the valve housing including an outer portion having an annular top wall and an annular side wall depending from the top wall, a valve positioned to lie within an interior region formed in the valve housing and arranged to move within the interior region to open and close a vent aperture formed in the valve housing, a tank mount made of a weldable plastics material, the tank mount including a housing mount arranged to mate with the annular top and side walls and an annular base coupled to the housing mount and adapted to be coupled to a fuel tank to support at least a portion of the valve housing within an interior region formed in the fuel tank, and wherein the annular side wall of the valve housing is arranged to surround the housing mount, and wherein the tank mount further includes a spaced-apart pair of axially extending annular flanges appended to the housing mount and arranged to mate with the outer portion of the valve housing to define a labyrinthine boundary between the housing mount and the outer portion of the valve housing.

25. The vent apparatus of claim 24, further comprising an O-ring seal positioned to lie between the pair of axially outwardly extending annular flanges.

26. A vent apparatus adapted to be coupled to a fuel tank, the apparatus comprising a valve housing made of a non-weldable plastics material, the valve housing including an outer portion having an annular top wall and an annular side wall depending from the top wall, a valve positioned to lie within an interior region fanned in the valve housing and arranged to move within the interior region to open and close a vent aperture fanned in the valve housing, a tank mount made of a weldable plastics material, the tank mount including a housing mount arranged to mate with the annular top and side walls and an annular base coupled to the housing mount and adapted to be coupled to a fuel tank to support at least a portion of the valve housing within an interior region formed in the fuel tank, and wherein the annular side wall of the valve housing is arranged to surround the housing mount, wherein the annular base underlies the housing mount and the annular side wall of the valve housing lies above a radially outer portion of the annular base, and wherein the housing mount further includes a pair of radially outwardly extending annular flanges cantilevered to the housing mount to lie above the radially outer portion of the annular base and mate with the annular side wall of the valve housing.

27. A vent apparatus adapted to be coupled to a fuel tank, the apparatus comprising a valve assembly including a valve housing made of a non-weldable plastics material and a valve arranged to move within an interior region formed in the valve housing to open and close a vent aperture fanned in the valve housing and a tank mount made of a weldable plastics material and adapted to support the valve housing within a mounting aperture fanned in a fuel tank, the tank mount including an annular base adapted to be coupled to a fuel tank and mount means for supporting the valve housing on the annular base and for mating with an interior wall defining an annular channel in the valve housing to establish a labyrinthine boundary lying between the tank mount and the valve housing in the annular channel and extending along radially outwardly facing and axially upwardly facing exterior walls of the tank mount.

* * * * *